US012621244B2

(12) United States Patent (10) Patent No.: US 12,621,244 B2
Schlake et al. (45) Date of Patent: May 5, 2026

(54) METHOD FOR PROVIDING AN EFFICIENT COMMUNICATION IN A HIERARCHICAL NETWORK OF DISTRIBUTED DEVICES

(71) Applicant: ABB Schweiz AG, Baden (CH)

(72) Inventors: Jan Christoph Schlake, Darmstadt (DE); Santonu Sarkar, Bangalore (IN); Marie Christin Platenius-Mohr, Hirschberg an der Bergstraße (DE); Madapu Amarlingam, Vikarabad (IN); Reuben Borrison, Brühl (DE)

(73) Assignee: ABB Schweiz AG, Baden (CH)

( * ) Notice: Subject to any disclaimer, the term of this patent is extended or adjusted under 35 U.S.C. 154(b) by 38 days.

(21) Appl. No.: 18/589,535

(22) Filed: Feb. 28, 2024

(65) Prior Publication Data

US 2024/0305572 A1 Sep. 12, 2024

(30) Foreign Application Priority Data

Mar. 9, 2023 (EP) ..................................... 23160980

(51) Int. Cl.
*H04L 12/24* (2006.01)
*H04L 41/0803* (2022.01)
(Continued)

(52) U.S. Cl.
CPC ...... *H04L 47/2441* (2013.01); *H04L 67/1097* (2013.01); *H04L 67/12* (2013.01)

(58) Field of Classification Search
CPC . H04L 47/2441; H04L 67/1097; H04L 67/12; H04L 67/1012; H04L 67/1021;
(Continued)

(56) References Cited

U.S. PATENT DOCUMENTS 7,623,505 B1 11/2009 Holur et al.
8,320,388 B2 11/2012 Louati et al.
(Continued)

FOREIGN PATENT DOCUMENTS

CN 105306366 B 7/2019
CN 115668084 A 1/2023
(Continued)

OTHER PUBLICATIONS

European Patent Office, Extended European Search Report in European Patent Application No. 23160980.1, 9 pp. (Aug. 30, 2023).
(Continued)

*Primary Examiner* — Moustafa M Meky
*Assistant Examiner* — Elizabeth Kassa
(74) *Attorney, Agent, or Firm* — Fitch Even Tabin & Flannery LLP

(57) ABSTRACT

A method for providing an efficient communication in a hierarchical network of distributed devices includes collecting first data from a first client device sent by a sensor via a second communication interface; storing the first data in a data storage; determining metadata of the first data; receiving a requirement information of the first data; generating classification information of the first data according to the metadata and the requirement information; providing the classification information to a master device and/or to a second client device according to a rule; and updating the classification information when the first data is changed.

15 Claims, 1 Drawing Sheet

(51) Int. Cl.

| | | |
|---|---|---|
| *H04L 47/2441* | (2022.01) | |
| *H04L 67/1097* | (2022.01) | |
| *H04L 67/12* | (2022.01) | |

(58) Field of Classification Search
CPC . H04L 67/1095; H04L 67/561; H04L 67/565; H04L 67/566; G05B 19/042; G05B 23/0213; H04W 4/38
USPC .......................................................... 709/219
See application file for complete search history.

(56) References Cited

U.S. PATENT DOCUMENTS

| | | | | |
|---|---|---|---|---|
| 8,656,017 | B2 | 2/2014 | Wang et al. | |
| 9,525,627 | B2 | 12/2016 | Padgett et al. | |
| 11,356,537 | B2 | 6/2022 | Lau et al. | |
| 11,488,377 | B1* | 11/2022 | Xu ........................ | G06V 10/774 |
| 2017/0046664 | A1* | 2/2017 | Haldenby .......... | G06Q 10/1097 |
| 2017/0167993 | A1* | 6/2017 | Eldardiry ............... | G01N 25/72 |
| 2020/0296186 | A1* | 9/2020 | Lau ....................... | H04L 43/062 |
| 2021/0049138 | A1* | 2/2021 | Srinivasulu ......... | G06F 18/2132 |
| 2021/0097469 | A1* | 4/2021 | Konti ................... | G06N 3/0455 |
| 2021/0125026 | A1* | 4/2021 | Perez Rua ............... | G06N 3/04 |
| 2022/0070051 | A1* | 3/2022 | Mortensen ........... | G06N 3/0499 |
| 2023/0143885 | A1* | 5/2023 | Day, Jr. ............. | G06F 16/24547 707/737 |
| 2023/0379250 | A1* | 11/2023 | Thubert .................. | H04L 45/42 |

FOREIGN PATENT DOCUMENTS

| | | | | | |
|---|---|---|---|---|---|
| GB | | 2588614 A | * | 5/2021 | ............. G06N 20/00 |
| WO | WO 2022/188983 A | | | 9/2022 | |

OTHER PUBLICATIONS

OPC Foundation, "What is OPC?," *OPC Foundation, The Industrial Interoperability Standard*, downloaded from the Internet on May 14, 2024, at https://opcfoundation.org/about/what-is-opc/, 2 pp. (2024).

OPC Router, "What is Opc Ua? The most important terms at a glance," downloaded from the Internet on May 14, 2024, at https://www.opc-router.de/was-ist-opc-ua/, 12 pp. (2024).

Wikipedia, "Data stream," article downloaded from the Internet on May 14, 2024, at https://en.wikipedia.org/wiki/Data_stream, 4 pp. (Mar. 3, 2024).

Wikipedia, "Publish-subscribe pattern," webpage downloaded from the Internet on May 14, 2024, at https://en.wikipedia.org/wiki/Publish%E2%80%93subscribe_pattern, 5 pp. (Apr. 3, 2024).

\* cited by examiner

METHOD FOR PROVIDING AN EFFICIENT COMMUNICATION IN A HIERARCHICAL NETWORK OF DISTRIBUTED DEVICES

CROSS-REFERENCE TO RELATED APPLICATIONS

The instant application claims priority to European Patent Application No. 23160980.1, filed Mar. 9, 2023, which is incorporated herein in its entirety by reference.

FIELD OF THE DISCLOSURE

The present disclosure generally relates to a method for providing an efficient communication in a hierarchical network of distributed devices.

BACKGROUND OF THE INVENTION

In a modern automation system, edge nodes, client devices, or edge devices are used to collect data and to run software applications to be used an industrial network process. The collected data are then transferred by the client devices to higher edge devices at a higher level or master devices to be stored in a central storage. Therefore, when specific data is required, one has always to access the central storage to get the data. U.S. Pat. No. 9,525,627 describes a system to transmit packages between a user device and a source network.

However, this classical approach to have a centralized data backbone is no longer useful when operating modern industrial processes. This is, as more and more data are made available to applications in the client devices, this data is usually high-frequency data and/or data with only a limited use for non-experts. As a result, a lot of bandwidth is wasted to transfer data which is afterwards not used any more if the classical approach is used by first sending data upward to a master device, e.g., a cloud, or higher edge nodes and then send it back to the lower edge node, where the data is consumed by an application.

BRIEF SUMMARY OF THE INVENTION

In one general aspect, the present disclosure describes an improved system and method for providing an efficient communication and an efficient data processing in a hierarchical network of distributed devices.

In a first aspect of the present disclosure, there is provided a method of providing an efficient communication in a hierarchical network of distributed devices comprising at least a master device, at least a first client device, wherein the at least first client device is connected via a first communication interface with the master device, comprising the following steps: collecting first data from the at least first client device sent by at least one sensor device via a second communication interface; storing the received first data in a data storage of the at least one client device; determining, by the at least first client device, metadata of the first data; receiving, by the at least first client device, a requirement information of the first data; generating a classification information of the received first data, by the at least first client device, according to the metadata and the requirement information of the first data; providing the classification information of the first data by the at least first client device to the master device and/or to at least a second client device according to a rule information; and updating the classification information, when the first data is changed.

In other words, embodiments in accordance with the disclosure improve a dynamic assignment of data types of data locally generated by a client device or lower edge device more efficiently and to provide an overall data overview in a hierarchical network of distributed devices, as data generated locally is not only but now also shared between client devices of the same hierarchical level. Each edge device in the network is now aware where required data is stored and if needed, can be directly enquired from the edge device storing the required data.

For this, it is beneficial that data received by a client device are classified or categorized in terms of the importance of the data by generating a classification information based on metadata indicating whether data should be shared with other devices or stored in a device and a requirement information indicating when and where data is needed at a certain time in the network.

BRIEF DESCRIPTION OF THE SEVERAL VIEWS OF THE DRAWING(S)

Exemplary embodiments will be described in the following with reference to the following drawings.

DETAILED DESCRIPTION OF THE INVENTION

Figures 1, 2:
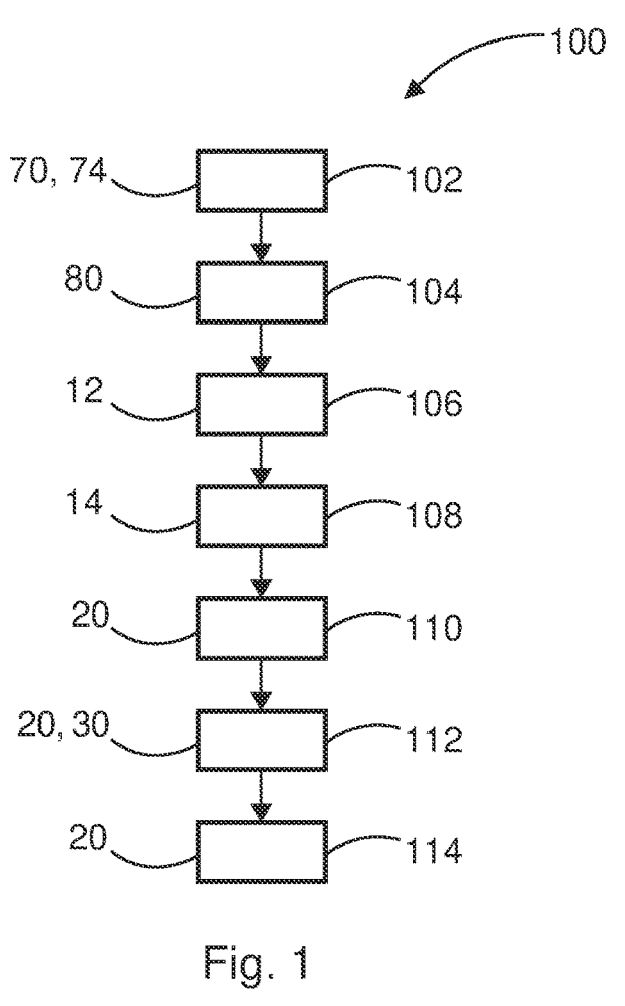
FIG. 1 is a flowchart for a method in accordance with the disclosure.
FIG. 2 is a flowchart for a method of data processing between a master device and a client device according to an embodiment of the present disclosure.

FIG. 1 illustrates a schematic flow-diagram of a method 100 of the present disclosure for providing an efficient communication in a hierarchical network 70 of distributed devices 72, 74, 76 comprising at least a master device 72, at least a first client device 74, wherein the at least first client device 74 is connected via a first communication interface 50 with the master device 72.

In first step 102, first data 10 is collected from the at least first client device 74 sent by at least one sensor device 78, e.g., a motor, a pump, via a second communication interface 52.

In a second step 104, the received first data 10 are stored in a data storage 80 of the at least one client device 74.

In a third step 106, metadata 12 of the first data 10 is determined by the at least first client device 74.

In a fourth step 108, a requirement information 14 of the first data 10 is received by the at least first client device 74.

In a fifth step 110, a classification information 20 of the received first data 10 is generated by the at least first client device 74 according to the metadata 12 and the requirement information 14 of the first data 10. The requirement information 14 defines a demand and supply of the first data 10 among the distributed network 70.

Regarding the classification information 20, the following can be said: The classification information 20 comprises at least one of the following: type or category of first data 10, cost of providing first data 10 or cost processing first data 10, availability or status of first data 10, a quality parameter of the first data 10 that defines whether the first data 10 fulfils a predefined quality in order to be usable by other devices in the network 70.

Further, optionally, the classification information 20 is generated by using a prediction model or a machine learning model, e.g., a neuronal or neural network that is at least partly located in the at least first client device 74. Hence, the classification information 20 is then stored locally in the first client device 74.

Further, optionally, the classification information 20 is updated at least partially by the at least one master device 72.

In a sixth step 112, the classification information 20 of the first data 10 is provided by the at least first client device 74 to the master device 72 and/or to at least a second client device 76 according to a rule information 30.

The rule information 30 can be locally stored in the first client device 74 and shared with any other device in the network 70 upon enquiry or in case of an update of the rule information 30. Optionally, the rule information 30 can be generated by the master device 72 and then globally distributed to any other device in the network 70.

In a seventh step 114, the classification information 20 is updated, when the first data 12 is changed. The seventh step may also be optional. The update of the classification information 20 can be triggered when a) additional first data 10 becomes available or b) metadata information 12 of the first data is changed or c) data demand or the requirement information 14 changes.

Optionally, the step 114 of updating the classification information 20 comprises a change of the at least following: metadata 12 of first data 10, requirement information 14 of first data 10, a configuration of the network 70 by installing or removing at least a client device or master device and/or at least a sensor device.

FIG. 2 illustrates a schematic example of a distributed network 70 exchanging data according to a method of the present disclosure.

The distributed network 70 is established in a hierarchical manner between the master device 72 and the first client device 74 and the second client device 76 to perform the aforementioned method. The first client device 74 is connected via a second communication interface 52 to a sensor device 78 that senses or processes sensed data, e.g., a temperature value, a speed value, as first data 10. Correspondingly, the second client device 76 is connected via the second communication interface 52 to a sensor device 79. Both client devices 74, 76 are connected via a first communication interface 50 to the master device 72. For reasons of a better visibility data exchange between the first client device 74 and the second client device 76 is not indicated in FIG. 2, but of course, such a data exchange is present according to the method of the present disclosure. The first client device 74 comprises a data storage 80. The second client device 76 comprises a data storage 82.

The master device 72 can optionally be connected to an external data center, e.g., a cloud, for exchanging the data.

In the following, further detailed aspects of the present disclosure are provided.

1) Data Demand based on Metadata: Each application can provide metadata about its data needs. This can be very specific (a single, specific data point is needed) or vague (all data of a specific type is needed). Very often this information is specified using tool specific formats. But there are also more and more standards or guidelines available. The metadata provides some more relevant information on the data such as a description, frequency, origin etc.

2) Global Data Manifesto: The global data manifesto or the requirement information 14 provides information from all other client edges about data demand and supply. The method of the present disclosure uses the global demand information to assign categories for local data.

3) Local Data Manifesto: The method of the present disclosure modifies the local data manifesto or classical information 20 based on various input. The local data manifesto describes where data is routed to and stored.

4) Prediction Model Learning Module: The Prediction Model Learning Module in a device of the network consists of two sub-modules: a) the learning sub-module: Machine learning methods or statistical methods are using historical data sets [including information about features (which data source points) and labels (which data sinks)]. The result is a prediction model which can predict the most likely category (and hence data sink) based on the feature information. b) The prediction sub-module: The latest prediction model is fed with current feature data to get a recommendation about best category.

5) Data Issue Detection Module: Data Routing only makes sense if the data quality is high enough to generate value in the target application. Hence, a data issue detection module is used to identify e.g., stall data. The information about faulty data is used by the method of the present information to modify the local data manifesto (=the classification information 20).

6) Data Matching Module: The data matching module uses application metadata and data source metadata to generate a local data manifesto. Therefore, the current rules, the latest prediction model, the information about data issues and the global data information from the data abstraction layer are used.

7) Rule Storage: All rules may be stored in a rule storage of a device of the network.

8) Data Categorization Module: The data categorization module may implement rules generated by the data matching module in a device of the network. If rules are changed, e.g., because a new application is installed, the data categorization module implements the adapted new rules.

9) Data Abstraction Layer: The data abstraction layer in a device 72, 74, 76 provides information about all globally available data in the network 70.

10) Hierarchical Edge Network: Today, edge devices are installed in process plants. In future, more and more edge devices will be installed in production sites, allowing the edge devices to form a network. Such a network can always be seen as a hierarchy with a higher-level (master) edge and a multitude of lower-level (client) edges.

The higher-level edge takes to role of an aggregator while the lower-level edges are mainly data collector. Applications can run in all edges taking into consideration the resource constraints. The simplest edge network runs two edges: One higher edge and one lower edge, but can be expanded in principle to an infinite number of devices.

An important aspect to take into consideration in such a hierarchical network is the communication in such a hierarchical edge network. To illustrate this, three examples are provided below.

A) Two-way Free Flow Communication: The ideal scenario: data can flow from and to all edges. The higher-level edge manages the lower-level edges. According to the method of the present disclosure, this is also the ideal situation:

A1) Data Connector are used to collect data from devices like motors and pumps or even Distributed Control Systems (DCS).

A2) A local Data Manifesto in a client device is created by the Data Matching Module of by assigning data to categories; the local data manifestos (=classification information) are shared with the higher-level edge to create the global data manifesto.

A3) Data flows to application according to the data manifesto using the rules implemented by the Data Categorization Module.

A4) In case of changes in data demand, e.g., a new MES application is installed, the local data manifesto of a client device is updated and implemented by the Data Categorization Module. Changes are shared with the higher (master) edge. At the same time the rules are updated (using heuristics or ML models generated by the Prediction Model Learning Module); new rules are also shared with higher (master) edge.

A5) the global manifesto in the master device is updated and changes are shared with all edges; new rules are also shared with all edges.

In a further communication scenario in a hierarchical network data can flow from and to the higher (master) edge device. The higher-level edge manages the lower-level (client) edge devices. For the present disclosure this means that global updates require manual intervention: Data Connector are used to collect data from devices like motors and pumps or Distributed Control Systems; A local Data Manifesto is created by the Data Matching Module of a client device, assigning data to categories; the local data manifestos are shared with the higher-level edge to create the global data manifesto. The client devices are using initially installed rules; Data flows to applications according to the data manifesto using the rules implemented by the Data Categorization Module.

In case of changes in data demand, e.g., a new MES application is installed, the local data manifesto of a client device is updated and implemented by the Data Categorization Module; changes are shared with the higher edge. At the same time the rules are updated (using heuristics or ML generated by the Prediction Model Learning Module); new rules are also shared with higher master edge device.

The global manifesto in the master device is updated; changes are shared manually with all client edges, e.g., when updates are made; new rules are also shared with all edges manually.

Compared to the previous scenario this one is more realistic but requires also the human in the loop to confirm updates.

In case the lower edges are not always connected to the higher master edge device, data can flow freely from and to all client edge devices. The higher-level master edge device manages the lower-level client edge devices, but has only access to them when they are connected. This scenario represents a flexible scenario where the network is under constant change. In this scenario, global updates are not always available:

Data Collector is collecting data from devices like motors and pumps

A local Data Manifesto of the client device is created by the Data Matching Module assigning data to categories. The local data manifestos are shared with the higher-level master edge devices to create the global data manifesto if connected. Initially installed rules in the client devices are used.

Data flows to applications according to the data manifesto implemented by the Data Categorization Module. Data flows only to the higher master edge device if connected.

In case of changes in data demand, e.g., a new application is installed, the local data manifesto is updated; changes are shared with the higher master edge device if connected. At the same time the rules are updated (using heuristics or ML generated by the Prediction Model Learning Module); new rules are also shared with higher edge if connected.

The global manifesto is updated; changes are shared manually with all devices, e.g., when updates are made; new rules are also shared with all edges manually if connected.

In this scenario, the updates of the local manifesto will take significantly longer then with the other scenarios due to the communication limitations.

Further, there are multiple ways to improve the category assignment.

First, a simple way is using heuristics: A user defines rules to assign status to data. Status can be something like hot, cold, or warm. Another differentiation can be the sink location for the data; a generalized configuration file containing all available tags in all edges (client device and master device); the expert rules are used to assign status for all tags; expert rules can be supported by statistics, e.g., how often requires a specific application data of a specific type. This helps to assign aspects like storage locations; Status information is added to the generalized configuration file; generalized configuration file is shared with other edges.

Each edge aggregates information to get an overall status for each tag and to decide where to send data and store data.

Second, another way to improve assignment rules is machine learning if enough historical data is available, as described before.

In reference to the embodiments of the present disclosure, the metadata may be generated using machine learning or other heuristic methods to decide for each edge the type of data in the edge and for how long data should be stored (change of status of the data) or to which location it should be transferred within the network. In this way, the knowledge of the topology of the edge network can be used to define optimal data handling strategies.

In this way, the data processing and communication in a hierarchical network of distributed devices becomes more efficient, as communication bandwidth and storage capacity is more efficiently used compared to the centralistic data processing approach.

For this, the hierarchical network or the system or platform comprises a number of client devices that are connected to other client devices and/or to at least one master device. The master device or higher-edge device usually executes a data-intensive data handling program, e.g., machine learning. The at least one client device or the lower-edge device usually collects data from a plant device censoring various types of data, e.g., temperature data, speed data.

At the client devices or lower edge devices, the classification information of data received is generated according to metadata defined by the client device. One task of the metadata is to classify the received data to a certain type of data such as raw data, hot data, warm data, cold data or cloud data.

Hot data or live data means that the latest data must be given as soon as possible when the edge or network infrastructure recovers connectivity from a failure. Application requires unprocessed, live telemetry data during training or during operation. Examples may be data for real time monitoring, prediction and actions. Hot data are data with an extremely high data availability requirement.

Warm data means that applications need the latest data but at a low or medium priority, after connectivity restoration. Applications do not require new data or data is not generated very frequently. Data collected after a long interval is sufficient. Warm data can be used for complex measurements such as misalignment, time-frequency domain conversion, resonance analysis, narrow band envelope analysis, etc. Warm data can be used for retraining a machine learning model. Typical applications can be periodic health monitoring or prediction.

Cold or offline data means that there is no need to get the latest data in the immediate future. Applications require a mix of warm and historical data to build robust machine learning models from scratch or perform periodic retraining if the model performance is unsatisfactory.

The generated classification information is then distributed and shared by the client device among a master device and/or further client devices in the network. This can happen according to a defined rule information. In this way, even if data is not transmitted, all devices of the network are now aware of the available data which are existing in each of the devices as either as actual data or as virtual data.

When the data is changed, e.g., by an update of an installed local device in the network or a change of the network topology, the classification information of the respective local client device is updated, giving all other devices in the network also an immediate update of which data is available in the network and how expensive it is to get it, e.g., by using a distance metric.

In the context of the present disclosure, data is telemetry data, alarm data and/or event data that are routed between the devices of the network, but the present disclosure is not restricted to this field of application.

A further advantage of the present disclosure is that data availability, classification and configuration information is shared between local client/edge devices in an efficient manner to ensure consistency, e.g., by using a generalized configuration file.

A further advantage of the present disclosure is that detection of similar data becomes easier in a network. This is done by using for example a pattern detection method e.g., from ML to identify "stall" data or other patterns. This includes not only stationary data, but also for example seasonality, oscillations and change points. Using this information helps to avoid unnecessary data transmission.

According to an example, the classification information comprises at least one of the following: type or category of first data, cost of first data, availability or status of first data, a quality parameter of the first data that defines whether the first data fulfils a predefined quality in order to be usable by other devices in the network. Therein, the advantage is achieved that a more detailed and efficient data handling strategy when exchanging data among devices of the network can be applied.

According to an example, the classification information is generated by using a prediction model or a machine learning model. In this way, the classification information can be generated in a more efficient way.

According to an example, the rule information is locally stored in the first client device and shared with any other device in the network upon enquiry or in case of an update of the rule information, or the rule information is generated by the master device and globally distributed to any other device in the network. In this way, the advantage of an efficient and standardized data transmission in the network is achieved.

According to an example, the step of updating the classification information comprises a change of the at least following: metadata of first data, requirement information of first data, a configuration of the network by installing or removing at least a client device or master device and/or at least a sensor device. In this way, a data transmission in the network is improved when the classification information depicts any relevant change in the network or of a data availability.

According to an example, the classification information is updated at least partially by the at least one master device. Therein, the advantage is achieved that a changed classification information can be efficiently distributed among the client devices connected to the master device of the network.

According to an example, the updating of the classification information is triggered by at least one of the following: additional first data becomes available, metadata (12) of the first data is changed or the requirement information 14 changes. In this way, a data transmission in the network is improved when the classification information depicts any relevant change in the network or of a data availability.

According to an example, the requirement information defines a demand and supply of the first data among the distributed network. In this way, any device in the network is aware of an actual data location and data availability.

According to an example, the data storage is at least partially a local data storage in the at least first client device. In this way, security-sensitive data can be efficiently protected in the network.

In a second aspect of the present disclosure, a computer is provided comprising a processor configured to perform the method of the preceding aspect.

In a third aspect of the present disclosure, there is provided a computer program product comprising instructions which, when the program is executed by a processor of a computer, causes the computer to perform the method of any of the first and second aspects.

In a fourth aspect of the present disclosure, a machine-readable data medium and/or download product containing the computer program of the third aspect.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCE SIGNS

100 Method
102 Collecting
104 Storing
106 Determining
108 Determining
110 Generating
112 Providing
114 Updating
10 First data
12 Metadata
14 Requirement information
20 Classification information
30 Rule information
50 First communication interface
52 Second communication interface
70 Hierarchical network
72 Master device
74 First client device
76 Second client device
78, 79 Sensor device
80, 82 Data storage

What is claimed is:

1. A method for providing an efficient communication in a hierarchical network of distributed devices comprising at least a master device, at least a first client device, wherein the at least first client device is connected via a first communication interface with the master device, the method comprising:

collecting first data by the at least first client device sent by at least one sensor device via a second communication interface;

storing the received first data in a data storage of the first client device;

determining by the at least first client device metadata of the first data;

receiving by the at least first client device a requirement information of the first data;

generating a classification information of the received first data by the at least first client device according to the metadata and the requirement information of the first data, wherein the classification information is generated using a prediction model or a machine learning model at the first client device, wherein the classification information is modified based on faulty data information;

providing the classification information of the first data by the at least first client device to the master device and/or to at least a second client device according to a rule information; and updating the classification information when the first data is changed, wherein the updating of the classification information is triggered by the requirement information changing.

2. The method according to claim 1, wherein the classification information comprises at least one of: type or category of first data, cost of providing first data, cost of processing of first data, availability or status of first data, a quality parameter of the first data that defines whether the first data fulfils a predefined quality to be usable by other devices in the network.

3. The method according to claim 1, wherein the rule information is locally stored in the first client device and shared with any other device in the network upon inquiry or in case of an update of the rule information, or the rule information is generated by the master device and globally distributed to any other device in the network.

4. The method according to claim 1, wherein updating the classification information comprises a change of at least one of: metadata of first data, requirement information of first data, a configuration of the network by installing or removing at least a client device or master device and/or at least a sensor device.

5. The method according to claim 1, wherein the classification information is updated at least partially by the at least one master device.

6. The method according to claim 1, wherein the requirement information defines a demand and supply of the first data among the distributed network.

7. The method according to claim 1, wherein the updating of the classification information is triggered by at least one of: additional first data becomes available, or metadata of the first data is changed.

8. The method according to claim 1, wherein the rule information defines how and to which devices the classification information is provided.

9. A computer program product comprising instructions stored in tangible non-transitory computer media which, when the computer program is executed by a processor of a computer, causes the computer to perform a method for providing an efficient communication in a hierarchical network of distributed devices comprising at least a master device, at least a first client device, wherein the at least first client device is connected via a first communication interface with the master device, the method comprising:

collecting first data by the at least first client device sent by at least one sensor device via a second communication interface;

storing the received first data in a data storage of the first client device;

determining by the at least first client device metadata of the first data;

receiving by the at least first client device a requirement information of the first data;

generating a classification information of the received first data by the at least first client device according to the metadata and the requirement information of the first data, wherein the classification information is generated by using a prediction model or a machine learning model at the first client device, wherein the classification information is modified based on faulty data information;

providing the classification information of the first data by the at least first client device to the master device and/or to at least a second client device according to a rule information; and updating the classification information when the first data is changed, wherein the updating of the classification information is triggered by the requirement information changing.

10. The computer program according to claim 9, wherein the classification information comprises at least one of: type or category of first data, cost of providing first data, cost of processing of first data, availability or status of first data, a quality parameter of the first data that defines whether the first data fulfils a predefined quality to be usable by other devices in the network.

11. The computer program according to claim 9, wherein the rule information is locally stored in the first client device and shared with any other device in the network upon inquiry or in case of an update of the rule information, or the rule information is generated by the master device and globally distributed to any other device in the network.

12. The computer program according to claim 9, wherein updating the classification information comprises a change of at least one of: metadata of first data, requirement information of first data, a configuration of the network by installing or removing at least a client device or master device and/or at least a sensor device.

13. The computer program according to claim 9, wherein the classification information is updated at least partially by the at least one master device.

14. The computer program according to claim 9, wherein the requirement information defines a demand and supply of the first data among the distributed network.

15. The computer program according to claim 9, wherein the updating of the classification information is triggered by at least one of: additional first data becomes available, metadata of the first data is changed or the requirement information changes.

* * * * *